United States Patent
Nakano

(10) Patent No.: US 9,009,280 B2
(45) Date of Patent: Apr. 14, 2015

(54) EQUIPMENT MANAGEMENT DEVICE, EQUIPMENT MANAGEMENT SYSTEM, EQUIPMENT MANAGEMENT METHOD, AND RECORDING MEDIUM

(75) Inventor: Toshio Nakano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 462 days.

(21) Appl. No.: 12/426,989

(22) Filed: Apr. 21, 2009

(65) Prior Publication Data

US 2009/0282146 A1 Nov. 12, 2009

(30) Foreign Application Priority Data

May 8, 2008 (JP) ................................ 2008-122427
May 12, 2008 (JP) ................................ 2008-125161
Feb. 20, 2009 (JP) ................................ 2009-038186

(51) Int. Cl.
G06F 15/173 (2006.01)
G06F 21/10 (2013.01)

(52) U.S. Cl.
CPC .............. *G06F 21/105* (2013.01); *G06F 21/10* (2013.01)

(58) Field of Classification Search
USPC ......................................................... 709/223
See application file for complete search history.

(56) References Cited

U.S. PATENT DOCUMENTS

| 6,859,793 B1 * | 2/2005 | Lambiase ........................ 705/39 |
| 2001/0011253 A1 * | 8/2001 | Coley et al. ..................... 705/59 |
| 2001/0013024 A1 | 8/2001 | Takahashi et al. |
| 2005/0010532 A1 * | 1/2005 | Garibay et al. ................. 705/59 |
| 2007/0008583 A1 | 1/2007 | Araki |

FOREIGN PATENT DOCUMENTS

| EP | 0 858 349 A | 7/1998 |
| EP | 1 883 032 A | 1/2008 |
| JP | 10-301786 A | 11/1998 |
| JP | 2001-222424 A | 8/2001 |
| JP | 2003-202988 | 7/2003 |
| JP | 2004-118584 A | 4/2004 |
| JP | 3540506 | 7/2004 |
| JP | 2005-321850 | 11/2005 |
| JP | 2007-034389 | 2/2007 |
| JP | 2007-048270 | 2/2007 |
| JP | 2007-058720 A | 3/2007 |

OTHER PUBLICATIONS

Microsoft Corporation: "Operations Guide: Microsoft Systems Management Server 2003" Internet Citation, [Online] XP002439673 Retrieved from the Internet.
Extended European Search Report.
Chinese Office Action dated Apr. 21, 2011.
Japanese Office Action dated Mar. 19, 2013.

* cited by examiner

*Primary Examiner* — Ryan Jakovac
(74) *Attorney, Agent, or Firm* — IPUSA, PLLC

(57) ABSTRACT

An equipment management device manages one or more pieces of equipment which are connected to the equipment management device via a network. The equipment management device includes a determining unit which determines whether a non-authenticated software item exists in each of the one or more pieces of equipment, and a license management unit which performs license management of one or more software items installed in each of the one or more pieces of equipment, based on a result of the determination by the determining unit.

16 Claims, 20 Drawing Sheets

FIG.4

| ■ EQUIPMENT LIST | |
|---|---|
| IP ADDRESS | DESCRIPTION |
| 192.168.11.XX1 | EQUIPMENT A |
| 192.168.11.XX2 | EQUIPMENT B |
| 192.168.11.XX3 | EQUIPMENT C |
| 192.168.11.XX4 | EQUIPMENT D |
| 192.168.11.XX5 | EQUIPMENT E |
| 192.168.11.XX6 | EQUIPMENT F |
| 192.168.11.XX7 | EQUIPMENT G |
| ......... | ......... |

FIG.5

■ INSTALLATION SETTING

SOFTWARE

| PROGRAM NAME | VERSION | CLASSIFICATION |
|---|---|---|
| PROGRAM A | 2.50 | APPLICATION |
| PROGRAM B | 1.00 | APPLICATION |
| ...... | ...... | ...... |

EQUIPMENT (FOR INSTALLING SOFTWARE)

| IP ADDRESS | DESCRIPTION |
|---|---|
| 192.168.11.XX1 | EQUIPMENT A |
| 192.168.11.XX2 | EQUIPMENT B |
| ...... | ...... |

FIG.6

| ■ EQUIPMENT LOGIN | |
|---|---|
| EQUIPMENT NAME: EQUIPMENT A | |
| USER: | User01 |
| PASSWORD: | ******* |

FIG.7

| PRODUCT KEY LIST | | |
|---|---|---|
| PRODUCT KEY | TOTAL NO. OF LICENSES | NO. OF UNUSED LICENSES |
| abc (123···) | 1 | 2 |
| xyz (098···) | 2 | 5 |
| ······ | ······ | ······ |

FIG.8

■ LICENSE AUTHENTICATION ACTIVATION SETTING

SOFTWARE: PROGRAM A

| EQUIPMENT | | |
|---|---|---|
| IP ADDRESS | DESCRIPTION | |
| 192.168.11.XX1 | EQUIPMENT A | |
| 192.168.11.XX2 | EQUIPMENT B | |
| ...... | ...... | |

FIG.9

| SERVER LOGIN | |
|---|---|
| EQUIPMENT NAME: LICENSE SERVER | |
| USER: | User01 |
| PASSWORD: | ******* |

FIG.10

■ LICENSE AUTHENTICATION DEACTIVATION SETTING

SOFTWARE: PROGRAM A

| EQUIPMENT | |
|---|---|
| IP ADDRESS | DESCRIPTION |
| 192.168.11.XX1 | EQUIPMENT A |
| 192.168.11.XX2 | EQUIPMENT B |
| ...... | ...... |

FIG.11

■ UNINSTALLATION SETTING

SOFTWARE

| PROGRAM NAME | VERSION | CLASSIFICATION |
|---|---|---|
| PROGRAM A | 2.50 | APPLICATION |
| PROGRAM B | 1.00 | APPLICATION |
| ...... | ...... | ...... |

EQUIPMENT (FOR UNINSTALLING SOFTWARE)

| IP ADDRESS | DESCRIPTION |
|---|---|
| 192.168.11.XX1 | EQUIPMENT A |
| 192.168.11.XX2 | EQUIPMENT B |
| ...... | ...... |

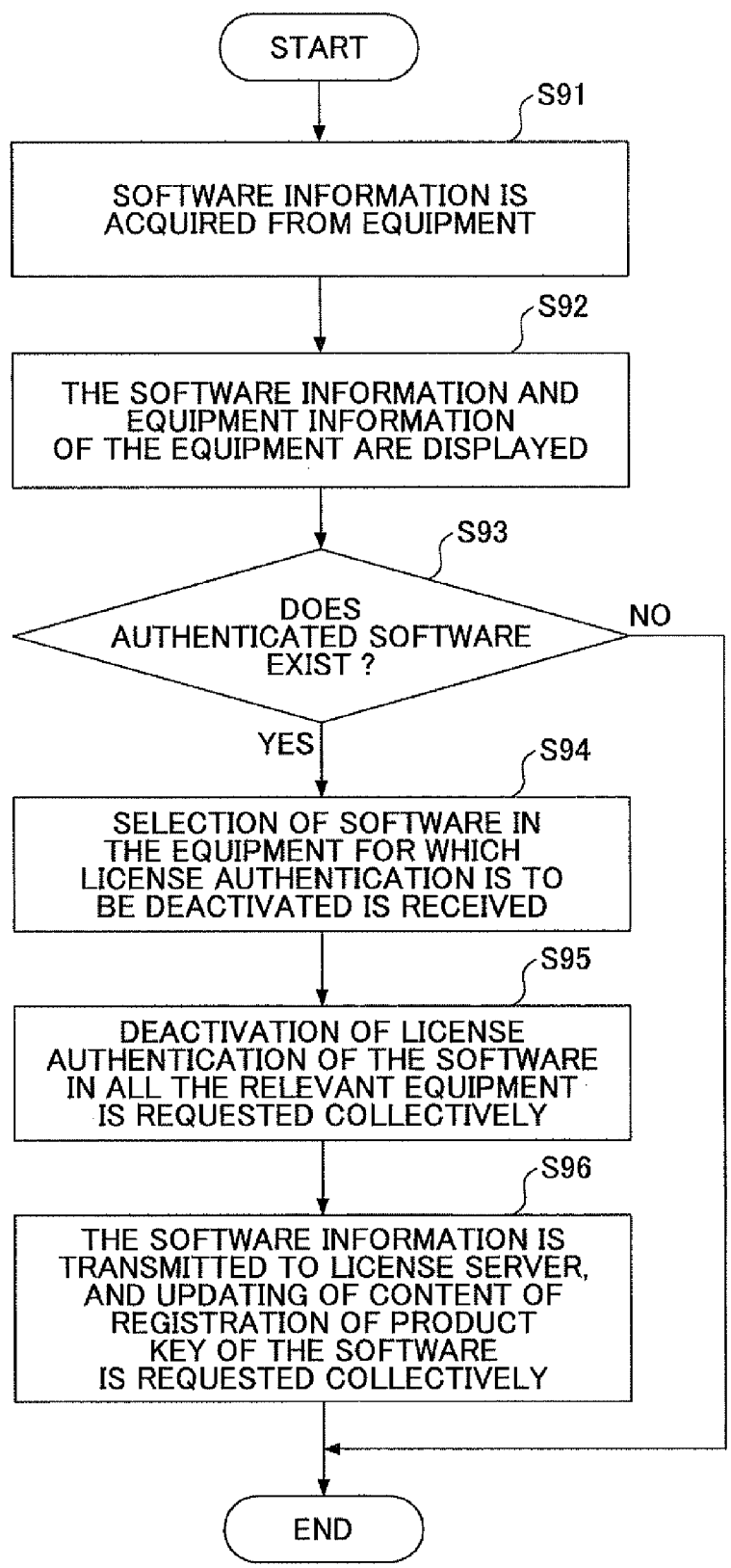

EQUIPMENT MANAGEMENT DEVICE, EQUIPMENT MANAGEMENT SYSTEM, EQUIPMENT MANAGEMENT METHOD, AND RECORDING MEDIUM

BACKGROUND OF THE INVENTION

1. Field of the Invention

This invention relates to an equipment management device and method for managing equipment, including image input/output devices (e.g., image forming devices, such as printers, copiers, fax machines, and image reading devices, such as scanners).

2. Description of the Related Art

It is known that application programs (software) are installed in some types of equipment, such as image input/output devices, to perform a predetermined function and a method of managing license authentication is used to manage execution of each application program. Management of license authentication is to manage the booting permission (use permission) of the software installed in the equipment by performing license authentication (activation) of the software or canceling the license authentication (deactivation) of the software.

For example, Japanese Laid-Open Patent Application No. 2007-034389, Japanese Laid-Open Patent Application No. 2005-321850, and Japanese Patent No. 3540506 disclose the composition of license authentication.

However, the composition according to the related art is to perform activation or deactivation of license authentication (including re-use permission of a product key used at a time of activating license authentication) for the equipment by means of an operation part thereof. For this reason, the equipment management method according to the related art has to perform, for each of one or more pieces of the equipment, activation or deactivation of license authentication of software installed in the equipment, which is time-consuming and inconvenient for the user.

When two or more pieces of the equipment exist, it is demanded that the user is able to perform collectively activation or deactivation of the license authentication for all the pieces of the equipment. It is also demanded that the user is able to perform activation or deactivation of the license authentication remotely from a terminal (e.g., a personal computer).

SUMMARY OF THE INVENTION

In one aspect of the invention, the present disclosure provides an improved equipment management device and method in which the above-described problems are eliminated.

In one aspect of the invention, the present disclosure provides an equipment management device, an equipment management method, and a computer-readable recording medium, which are adapted to improve convenience for the user in performing activation and/or deactivation of the license authentication for one or more pieces of the equipment.

In an embodiment of the invention which solves or reduces one or more of the above-mentioned problems, the present disclosure provides an equipment management device which manages one or more pieces of equipment which are connected to the equipment management device via a network, the equipment management device comprising: a determining unit configured to determine whether a non-authenticated software item exists in each of the one or more pieces of equipment; and a license management unit configured to perform license management of one or more software items installed in each of the one or more pieces of equipment, based on a result of the determination by the determining unit.

In an embodiment of the invention which solves or reduces one or more of the above-mentioned problems, the present disclosure provides an equipment management method for use in an equipment management system in which one or more pieces of equipment and an equipment management device to manage the one or more pieces of equipment are connected via a network, the equipment management method comprising: causing the equipment management device to determine whether a non-authenticated software item exists in each of the one or more pieces of equipment; causing the equipment management device to acquire equipment information from a corresponding piece of the equipment which installs a non-authenticated software item; causing the equipment management device to generate a license code based on both a predetermined product key and the acquired equipment information; causing the equipment management device to transmit a request of license authentication with the generated license code to the corresponding piece of the equipment when it is determined that a non-authenticated software item exists in the corresponding piece of the equipment; and causing the corresponding piece of the equipment to perform license authentication based on the license code received from the equipment management device.

In an embodiment of the invention which solves or reduces one or more of the above-mentioned problems, the present disclosure provides a computer-readable recording medium storing a program which, when executed by a computer of an equipment management device which manages one or more pieces of equipment which are connected to the equipment management device via a network, causes the computer to perform an equipment management method, the equipment management method comprising: determining whether a non-authenticated software item exists in each of the one or more pieces of equipment; and performing license management of one or more software items installed in each of the one or more pieces of equipment, based on a result of the determination.

Other objects, features and advantages of the invention will become more apparent from the following detailed description when read in conjunction with the accompanying drawings.

BRIEF DESCRIPTION OF THE DRAWINGS

FIG. 4 is a diagram showing an example of an equipment list screen of an embodiment of the invention.

FIG. 5 is a diagram showing an example of an installation setting screen of an embodiment of the invention.

FIG. 6 is a diagram showing an example of an equipment login screen of an embodiment of the invention.

FIG. 7 is a diagram showing an example of a product key list screen of an embodiment of the invention.

FIG. 8 is a diagram showing an example of a license authentication setting screen of an embodiment of the invention.

FIG. 9 is a diagram showing an example of a server login screen of an embodiment of the invention.

FIG. 10 is a diagram showing an example of a license authentication deactivation setting screen of an embodiment of the invention.

FIG. 11 is a diagram showing an example of an uninstallation setting screen of an embodiment of the invention.

FIG. 20 is a flowchart for explaining a license authentication deactivation process of the fourth embodiment of the invention.

DETAILED DESCRIPTION OF THE PREFERRED EMBODIMENTS

A description will be given of embodiments of the invention with reference to the accompanying drawings.

Figure 1:
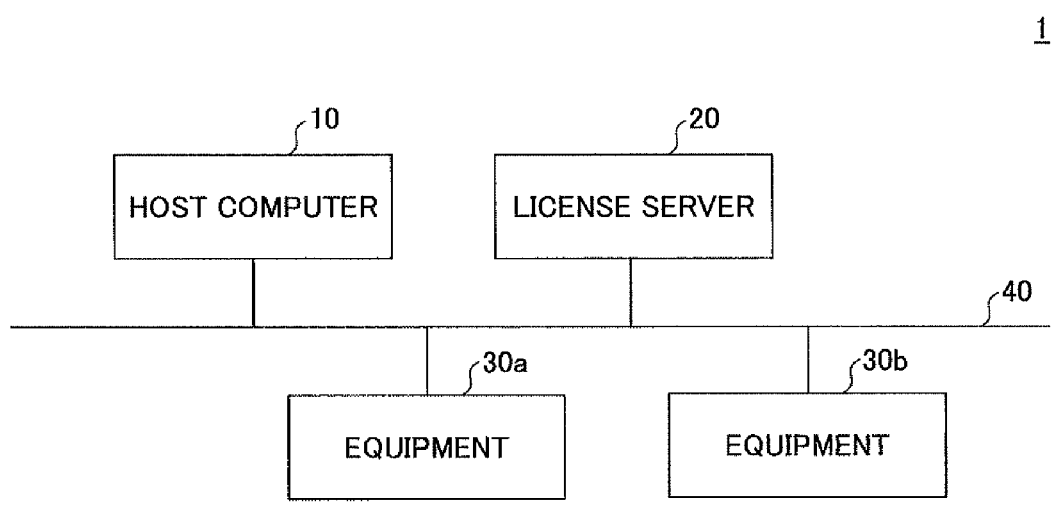
FIG. 1 is a block diagram showing the composition of an equipment management system of an embodiment of the invention.

The composition of an equipment management system of an embodiment of the invention will be described with reference to FIG. 1. FIG. 1 shows the composition of an equipment management system 1 of this embodiment.

The equipment management system 1 includes a host computer 10, a license server 20, and two or more pieces of equipment 30 (30a and 30b). These components are interconnected by a network 40, such as a LAN (local area network), so that the components can communicate with each other via the network 40.

The host computer 10 is an equipment management device which manages the equipment 30, and the host computer 10 is constituted by an information processing device, such as a PC or a workstation. The host computer 10 may be constituted by a client computer or a print server. In a case in which the composition of a print server system is used, a client computer may be a web client (or a Web server, a web browser, etc.) of a print server which provides a printing service.

The license server 20 is an authentication management device, and this license server 20 is constituted by an information processing device having the composition which is the same as that of the host computer 10.

The pieces of equipment 30 are image input/output devices (for example, image forming devices or image reading devices) which operate based on the software components, such as application programs.

Figure 2:
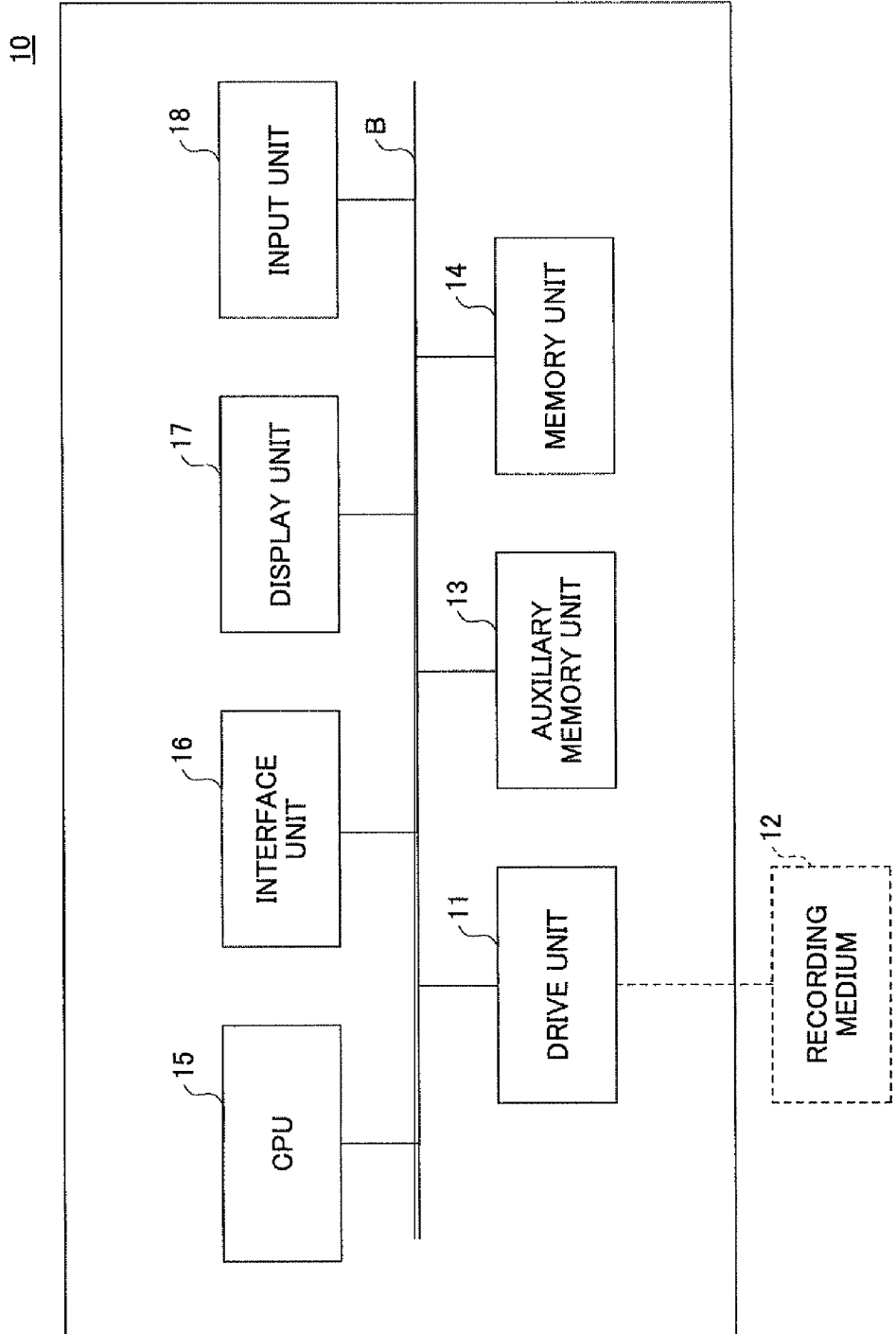
FIG. 2 is a block diagram showing the hardware composition of a host computer of an embodiment of the invention.

Next, the hardware composition of the host computer 10 of an embodiment of the invention will be described with reference to FIG. 2. FIG. 2 shows the hardware composition of the host computer 10 of this embodiment.

The host computer 10 includes a drive unit 11, an auxiliary memory unit 13, a memory unit 14, a CPU (central processing unit) 15, an interface unit 16, a display unit 17, and an input unit 18, which are interconnected by a bus B.

A program which carries out processing of the host computer 10 is supplied by using a recording medium 12. When the recording medium 12 in which the program is recorded is set in the drive unit 11, the program from the recording medium 12 is installed in the auxiliary memory unit 13 through the drive unit 11. The auxiliary memory unit 13 stores the necessary files, data, etc. and stores the installed program.

When a program starting request is received, the program is read from the auxiliary memory unit 13, and the program is stored in the memory unit 14. The CPU 15 carries out a predetermined function (including the function according to the invention) of the host computer 10 in accordance with the program stored in the memory unit 14.

Furthermore, in the composition of FIG. 2, the interface unit 16 is used as an interface for connecting the host computer 10 to the network 40. The display unit 17 displays a GUI (graphical user interface), a web browser, etc. in accordance with the program. The input unit 18 includes a keyboard, a mouse, etc., and the input unit 18 is used to input various kinds of operation requests.

Using the recording medium 12 to install the program is not necessarily requested. Alternatively, the program may be downloaded from another computer to the host computer 10 through the network 40.

Next, the hardware composition of the license server 20 and the equipment 30 of this embodiment will be described As described above, the license server 20 may be constituted to have the hardware composition which is the same as that of the host computer 10. However, when operation of the license server 20 is remotely controlled through the network 40, the display unit 17 and the input unit 18 are not necessarily requested. The license server 20 is capable of carrying out the functions to serve as a license code generating unit and a license code transmitting unit, which will be described below.

When an image processing device is used as the equipment 30, the controller provided in the equipment 30 may be constituted to have the hardware composition which is the same as that of the host computer 10. The equipment 30 in this case is provided with an operation panel as the hardware corresponding to the display unit 17 and the input unit 18. The equipment 30 in this case is provided with the hardware specific to the image processing device, such as a scanner (an imaging part) and a plotter (a printing part).

Next, the software composition of the host computer 10 of this embodiment will be described with reference to FIG. 3. A process according to each program which constitutes the software is performed actually by the CPU 15 which operates in accordance with the program. However, for the sake of convenience, it is assumed that each program performs a process. In the following description, it is assumed that a program performs a certain process.

Figure 3:
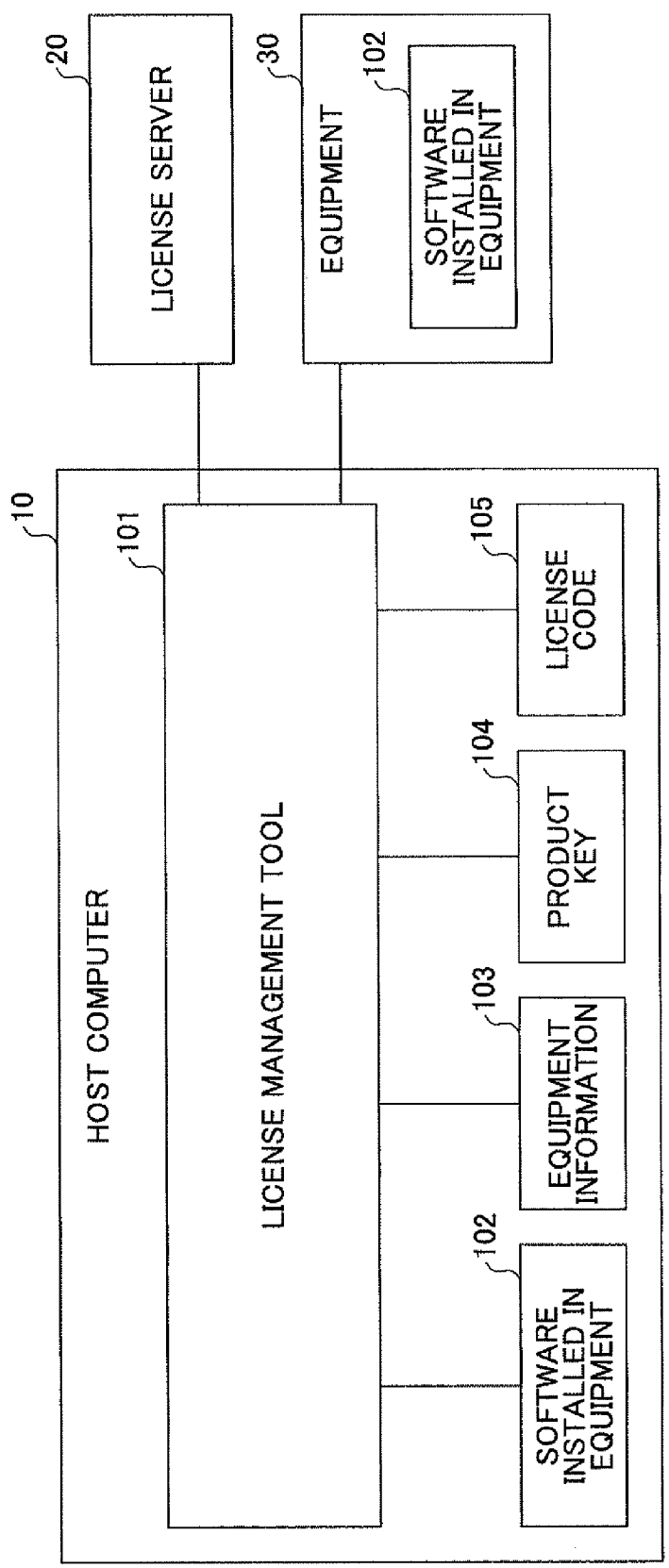
FIG. 3 is a block diagram showing the software composition of a host computer of an embodiment of the invention.

FIG. 3 shows the software composition of the host computer 10 of this embodiment. As shown in FIG. 3, the host computer 10 includes a license management tool 101.

The license management tool 101 performs activation and/or deactivation of license authentication of software 102 installed in the equipment 30 for the equipment 30. The license management tool 101 is also capable of performing installation/uninstallation of the software 102 in the equipment 30 for the equipment 30. At this time, the program (program of the software 102 installed in the equipment 30) selected as installation software is stored in the auxiliary memory unit 13 of the host computer 10.

In the composition of FIG. 3, equipment information 103 is information which is acquired from the equipment 30 by the license management tool 101. The acquired equipment information 103 includes information specific to the equipment 30, such as a model name, a machine identifier, an IP address, etc., and such information is stored into the auxiliary memory unit 13. A product key 104 is information which is purchased (or prepared) beforehand in association with the software 102 installed in the equipment 30, and such information is stored into the auxiliary memory unit 13. The product key 104 is information which is used when generating a license code 105, which will be described below.

In the composition of FIG. 3, license code 105 is information which is used when performing license authentication of the software 102 installed in the equipment 30. The license code 105 is generated by the license management tool 101 or acquired from the license server 20 by the license management tool 101. The license code 105 is generated based on the above-mentioned equipment information 103 and the above-mentioned product key 104. The license code 105 after the acquisition or the generation is stored into the auxiliary memory unit 13.

Next, the software composition of the license server 20 and the equipment 30 of this embodiment will be described.

The license server 20 has license information which is used to manage activation and/or deactivation of license authentication (for the purpose of license management). This license information is associated with the equipment information 103 of the equipment 30, the product key 104 corresponding to the software 102 installed in the equipment 30, and the license code 105 generated based on the equipment information 103 and the product key 104.

In the equipment 30, the software 102 may be installed beforehand. In such a case, it is not necessary to install the software 102 in the equipment 30 by using the license management tool 101. Moreover, in such a case, execution of the software 102 installed beforehand in the equipment is permitted when activation of license authentication of the software is performed by the license management tool 101, and inhibited when deactivation of the license authentication is performed by the license management tool 101.

Next, the functions of the license management tool 101 of this embodiment will be described with reference to FIGS. 4 to 9.

For example, operation of the license management tool 101 is started in response to receiving an operation starting request input by the user through the input unit 18. Upon starting of the license management tool 101, an equipment list screen as shown in FIG. 4 is displayed on the display unit 17 in the host computer 10.

(1) Registration of Equipment to be Managed

FIG. 4 shows an example of the equipment list screen of this embodiment. The license management tool 101 uses the equipment list screen to receive selection of a piece of equipment to be managed. For example, selection of the equipment 30 is performed by directly inputting an IP address or by selecting one from among the pieces of equipment in the equipment list. After the selection of a piece of equipment is received, the license management tool 101 registers (or adds) the selected piece of the equipment 30 as the management object equipment.

Alternatively, another method of registering the equipment 30 may be used in which the license management tool 101 reads out a data file that defines the information of the equipment 30. When the information defined in the data file includes two or more pieces of the equipment 30, a batch registration process may be performed for all the defined pieces of the equipment 30.

After the information of the new equipment 30 is registered in this way, the license management tool 101 updates the contents of the equipment list and displays the resulting equipment list.

(2) Software Installation

The license management tool 101 displays an installation setting screen, as shown in FIG. 5, when an installation request of the software 102 is received. FIG. 5 shows an example of the installation setting screen of this embodiment.

The license management tool 101 uses the installation setting screen to receive selection of the software 102 to be installed and selection of the equipment 30 of the installation place. For example, selection of the software 102 is performed by directly inputting a program name or by selecting one from among the programs in the software list. Selection of the installation place is performed by directly inputting an IP address or by selecting one from among the pieces of the equipment in the equipment list.

After the selection of the equipment 30 of the installation place is received, the license management tool 101 acquires the latest equipment information 103 from the selected equipment 30, and performs the updating of the equipment information.

The license management tool 101 may be arranged to receive selection of two or more pieces of the equipment 30 as the installation place. When the selection of two or more pieces of the equipment 30 is received, the latest equipment information 103 is acquired from each of the selected pieces of the equipment 30.

Subsequently, the license management tool 101 transmits a request for installation of the software 102 to the selected piece of the equipment 30. As a result, installation of the selected software 102 is performed by the selected piece of the equipment 30. At this time, the license management tool 101 transmits the selected program to the equipment 30 of the installation place and causes the equipment 30 to perform installation of the software 102. The equipment 30 performs installation of the software in the equipment 30 based on the selected program received.

When the equipment 30 to which the software installation request is to be transmitted has a user authentication function on the user access, an equipment login screen as shown in FIG. 6 is displayed on the display unit 17 provided in the host computer 10.

FIG. 6 shows an example of the equipment login screen of this embodiment. The license management tool 101 is arranged to transmit the program of the software 102 to the equipment 30 only when the equipment login screen is displayed and the user access to the equipment 30 is attested.

The display of the equipment login screen is not necessarily provided even when the equipment 30 has a user authentication function. For example, when user authentication is performed previously, it is not necessary to display the equipment login screen subsequently.

(3) Selection of Product Key

The license management tool 101 displays a product key list screen, as shown in FIG. 7, when performing license authentication of the software 102 installed in the equipment 30. FIG. 7 shows an example of the product key list screen of this embodiment.

The license management tool 101 uses the product key list screen to receive selection of a product key 104 corresponding to the software 102 the license authentication of which is to be performed. For example, selection of the product key 104 is performed by selecting one from among the product keys in the product key list. Because the product key 104 is the information which is purchased (or prepared) beforehand in association with the software 102 in the equipment 30 as described above, the user selects a suitable product key 104 from the product key list screen in accordance with the association.

(4) License Authentication

When a license authentication request is received, the license management tool 101 displays a license authentication setting screen as shown in FIG. 8. The license management tool 101 in this embodiment displays the license authentication setting screen even when license authentication of the software 102 which operates in the management object equipment is not yet carried out. Alternatively, the license management tool 101 may be arranged so that a license authentication setting screen is displayed only when the license authentication is not carried out and two or more applicable items of the software 102 exist.

FIG. 8 shows an example of the license authentication setting screen of this embodiment. The license management tool 101 uses this license authentication setting screen to receive selection of the equipment 30 (or the equipment 30 for which license authentication is to be performed) in which the software 102 the license authentication of which is to be performed operates. Selection of the equipment 30 is performed by directly inputting an IP address or by selecting one from among the pieces of the equipment in the equipment list.

After the selection of the equipment 30 for which license authentication is to be performed is received, the license management tool 101 acquires the latest equipment information 103 from the selected equipment 30 and performs updating of the equipment information.

The license management tool 101 may be arranged to receive selection of two or more pieces of the equipment 30 for which license authentication is to be performed. When the selection of two or more pieces of the equipment 30 is received, the license management tool 101 acquires the latest equipment information 103 from each of the selected pieces of the equipment 30.

Subsequently, the license management tool 101 requests license authentication of the software 102 to the selected equipment 30. As a result, license authentication of the software 102 is performed by the equipment 30. At this time, the license management tool 101 requests the license authentication of the software 102 by transmitting a license code 105 and a predetermined request command to the equipment 30. The equipment 30 performs the license authentication based on the license code 105 received in response to the request.

When the license management tool 101 has the function to generate a license code 105, the license management tool 101 generates a license code 105 based on the acquired equipment information 103 and the selected product key 104, and transmits the license code 105 to the equipment 30.

On the other hand, when the license server 20 has the function to generate a license code 105, the license management tool 101 transmits to the license server 20 the acquired equipment information 103 and the selected product key 104, and requests generation of a license code 105 to the license server 20. At this time, if the license server 20 has a user authentication function, a server login screen, as shown in FIG. 9, is displayed on the display unit 17 in the host computer 10.

FIG. 9 shows an example of the server login screen of this embodiment. If this server login screen is displayed, the license management tool 101 receives the license code 105 from the license server 20 only when the user access is attested in the license server 20. Then, the license management tool 101 transmits the received license code 105 to the equipment 30.

The display of the server login screen is not necessarily provided even when the license server 20 has a user authentication function. Similar to the equipment login screen mentioned above, when user authentication is performed previously, it is not necessary to display the server login screen subsequently.

When the software 102 for which license authentication is to be performed includes two or more programs, such as plug-ins, the license management tool 101 generates or acquires a license code 105 for every program (or for every corresponding product key 104).

When the selection of two or more pieces of the equipment 30 for which license authentication is to be performed is received, the license management tool 101 generates or acquires a corresponding number of license codes 105 for the number of the selected pieces of the equipment 30. The maximum number of license codes 105 that can be generated or acquired in this case is equal to the number of non-used license codes 105 among the license codes 105 which can be generated from the product key 104.

(5) Deactivation of License Authentication

When a deactivation request of license authentication is received, the license management tool 101 displays a license authentication deactivation setting screen as shown in FIG. 10. FIG. 10 shows an example of the license authentication deactivation setting screen of this embodiment.

The license management tool 101 uses the license authentication deactivation setting screen to receive selection of the equipment 30 in which the software 102 for which license authentication is to be canceled operates (or selection of the equipment 30 for which license authentication is to be canceled). Selection of the equipment 30 in this case is the same as the selection of the equipment 30 at the time of performing license authentication, and a description thereof will be omitted.

After the selection of the equipment 30 for which license authentication is to be canceled is received, the license management tool 101 requests deactivation of license authentication by transmitting a predetermined request command to the equipment 30. As a result, the equipment 30 performs deactivation of license authentication of the software 102 selected in response to the request.

Moreover, the license management tool 101 changes the contents of registration of the product key 104 corresponding to the software 102 the license authentication of which is canceled, based on the result of operation in the equipment 30.

When the license management tool 101 has a function to change the contents of registration of the product key 104, the license management tool 101 changes the contents of registration managed by the license management tool 101. On the other hand, when the license server 20 has the function to change the contents of registration of the product key 104, the license management tool 101 requests changing of the contents of registration to the license server 20. When the license server 20 has a user authentication function, the above-described server login screen is displayed.

(6) Software Uninstallation

When an uninstallation request of the software 102 installed in the equipment 30 is received, the license management tool 101 displays an uninstallation setting screen, as shown in FIG. 11. FIG. 11 shows an example of the uninstallation setting screen of this embodiment.

The license management tool 101 uses the uninstallation setting screen to receive selection of the software 102 to be uninstalled and the equipment 30 in which uninstallation of the software 102 is to be performed. Selection of the software 102 and the equipment 30 is the same as the software equipment selection at the time of installation, and a description thereof will be omitted.

Subsequently, the license management tool 101 requests uninstallation of the selected software 102 to the selected equipment 30. The equipment 30 performs uninstallation of the selected software 102.

Taking into consideration the above-described functions of the license management tool 101, a description will be given of various processes concerning the license management (activation and/or deactivation of license authentication) performed by the equipment management system 1 with reference to FIGS. 12 to 20.

In the following, two kinds of equipment management systems 1 are considered. One is the system in which the host computer 10 and the license server 20 are separately arranged as shown in FIG. 1. The other is the system in which the host computer 10 having the function of the license server 20 is arranged (or the host computer 10 and the license server 20 are constituted by a single device).

In the following, it is assumed that the software 102 for license management is installed in the equipment 30, and the equipment 30 and the license server 20 have no user authentication function.

A description will be given of a first embodiment of the invention. In the first embodiment, the processes concerning the license management are performed by the equipment management system 1 in which the host computer 10 having the function of the license server 20 is arranged.

Figure 12:
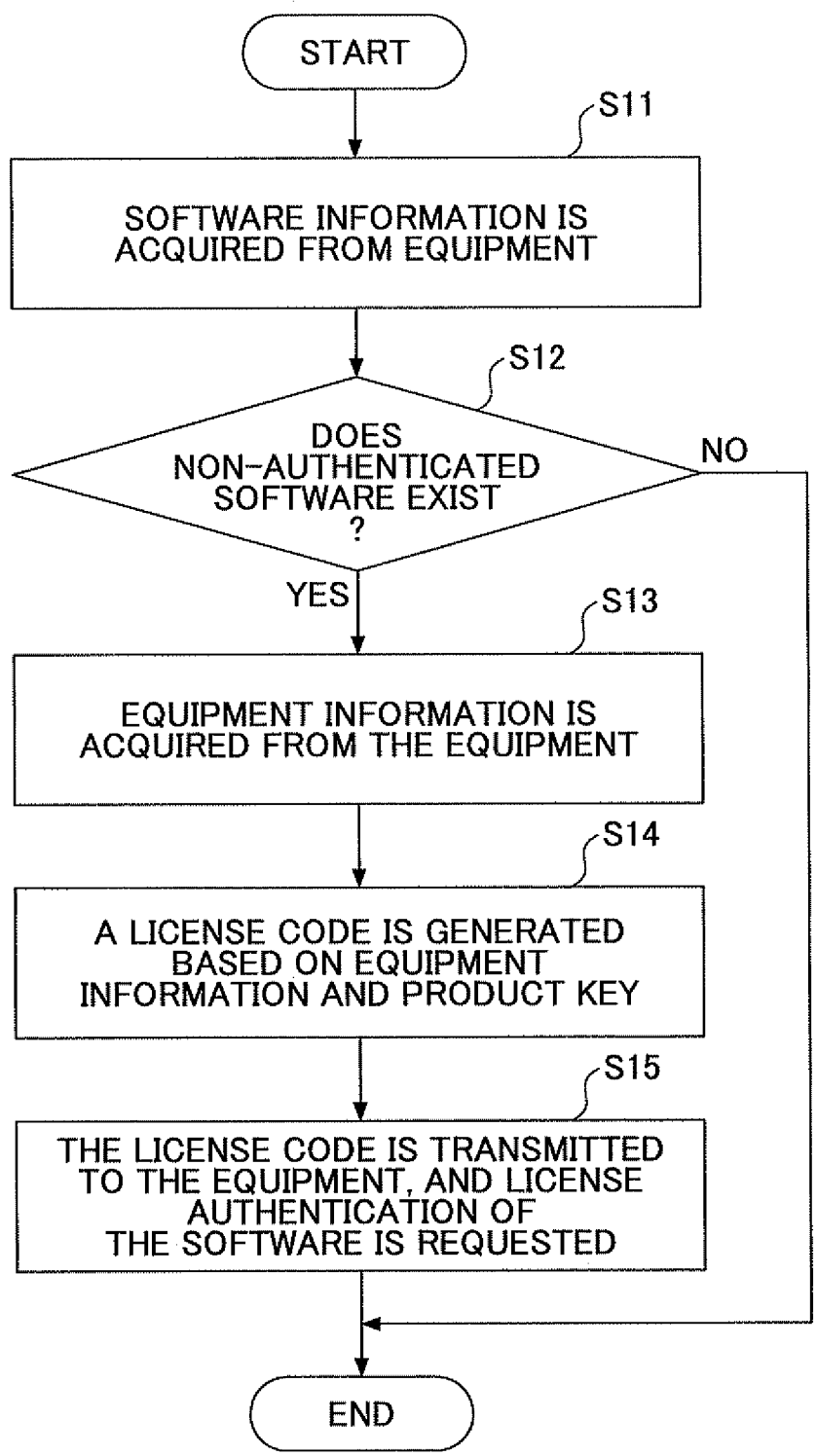
FIG. 12 is a flowchart for explaining a license authentication process of a first embodiment of the invention.

FIG. 12 is a flowchart for explaining a license authentication process of the first embodiment.

For example, when an update request of the information of the license code 105 corresponding to the product key 104 of the software 102 installed in the equipment 30 is received (or when a request for execution of the license authentication of the software 102 is received), the license management tool 101 of the host computer 10 starts performing the process of FIG. 12.

Upon start of the process of FIG. 12, the license management tool 101 of the host computer 10 acquires the information of the software 102 installed in the equipment 30 (software information) from the equipment 30 (step S11). At this timer the license management tool 101 transmits a predetermined request command to the equipment 30 to request the information acquisition.

In response to the request, the equipment 30 transmits the software information to the host computer 10. Data transmission and reception between the equipment 30 and the host computer 10 is performed through the network 40.

Then, based on the acquired software information, the license management tool 101 determines whether a non-authenticated item of the software 102 exists among the items of the software 102 installed in the equipment 30 (step S12).

When it is determined in step S12 that a non-authenticated software item does not exist, the process is terminated. On the other hand, when it is determined in step S12 that a non-authenticated software item exists, the license management tool 101 acquires the equipment information 103 from a corresponding piece of the equipment 30 which installs the non-authenticated software item (step S13).

The license management tool 101 generates a license code 105 based on the acquired equipment information 103 and the predetermined product key 104 corresponding to the non-authenticated item of the software 102 (step S14).

The license management tool 101 transmits the generated license code 105 to the corresponding piece of the equipment 30, and requests the corresponding piece of the equipment 30 to perform license authentication of the non-authenticated software item (step S15). At this time, the license management tool 101 transmits a predetermined license authentication request command with the license code 105 to the corresponding piece of the equipment 30.

As a result, the corresponding piece of the equipment 30 performs license authentication of the non-authenticated item of the software 102, based on the license code 105 received from the license management tool 101, and execution of the software item is permitted by the license authentication.

Figure 13:
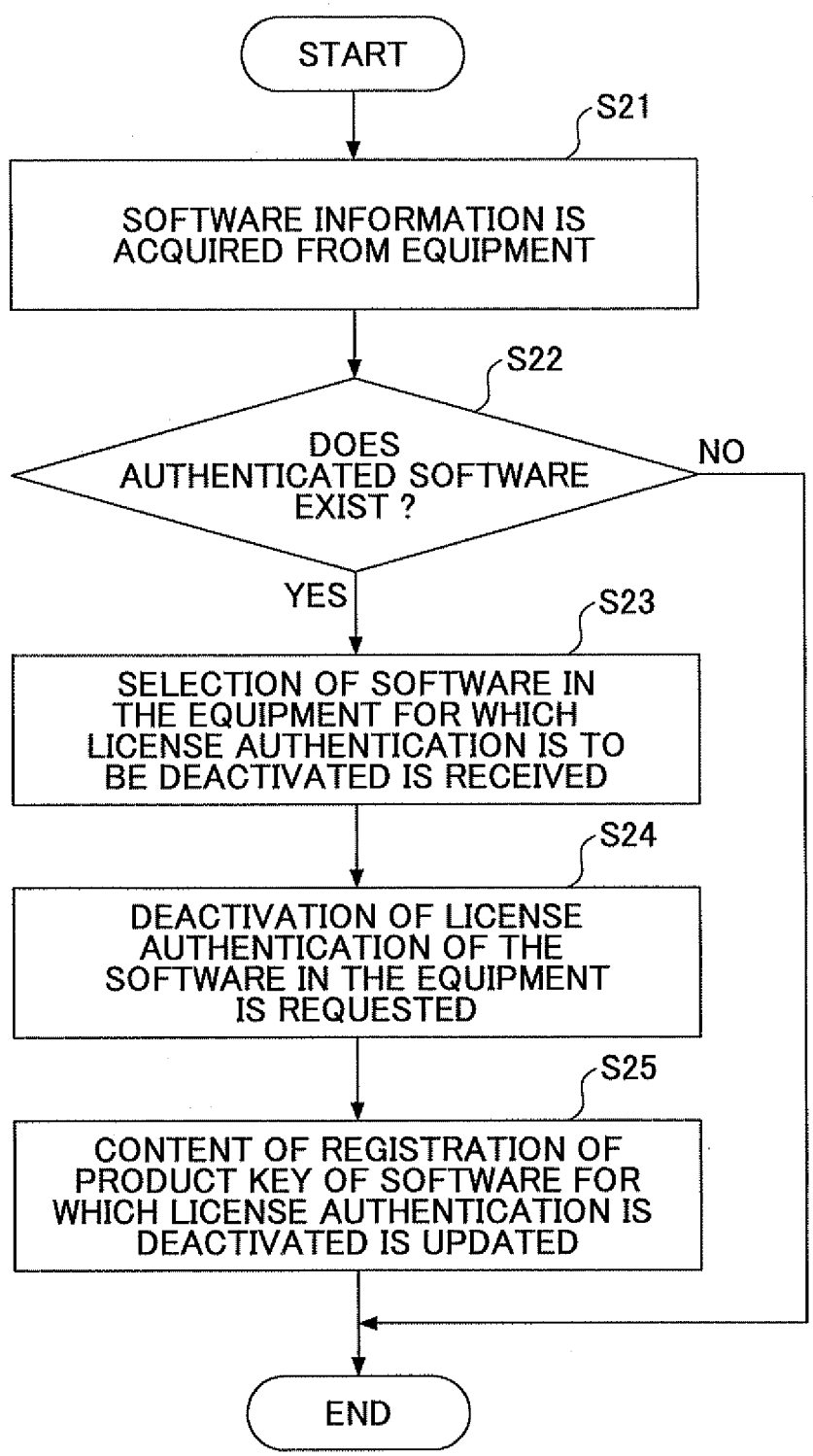
FIG. 13 is a flowchart for explaining a license authentication deactivation process of the first embodiment of the invention.

FIG. 13 is a flowchart for explaining a license authentication deactivation process of the first embodiment.

For example, when a request of deactivation of the license authentication of the software 102 installed in the equipment 30 is received, the license management tool 101 of the host computer 10 starts the process of FIG. 13.

Upon start of the process of FIG. 13, the license management tool 101 of the host computer 10 acquires software information of the software 102 from the equipment 30 (step S21).

Then, the license management tool 101 determines whether an authenticated item of the software 102 exists among the items of the software 102 installed in the equipment 30, based on the acquired software information (step S22).

When it is determined in step S12 that an authenticated software item does not exist, the process is terminated. On the other hand, when it is determined in step S22 that an authenticated software item exists, the license management tool 101 displays the above-described license authentication deactivation setting screen, and receives selection of the item of the software 102 for which the license authentication is to be deactivated (step S23).

Alternatively, at this time, the above-described license authentication deactivation setting screen may be displayed when two or more authenticated items of the software 102 in the equipment 30 exist. When only one authenticated software item exists, a deactivation request check and selection screen (not shown) may be displayed instead.

The license management tool 101 requests the equipment 30 to deactivate the license authentication of the selected software item (step S24). At this time, the license management tool 101 transmits a predetermined deactivation request command to the equipment 30 to request deactivation of the license authentication of the selected software item.

As a result, the equipment 30 performs deactivation of the authenticated item of the software 102 in response to the request, and execution of the software item is inhibited.

Then, the license management tool 101 updates the contents of registration of the product key 104 corresponding to the canceled software item based on the acquired software information (step S25). Namely, at step S25, the license information is updated to indicate that re-use of the product key 104 used at the time of license authentication is allowed.

As described above, according to the license management of the first embodiment, the processes concerning the license management (activation and/or deactivation of license authentication) to the software 102 installed in the equipment 30 can be performed remotely from the host computer 10 via the network 40. Thereby, the user does not need to perform license management for each of the pieces of the equipment 30, and does not need to operate license management through the operation panel. It is possible to improve convenience for the user in performing the license management for two or more pieces of the equipment.

A description will be given of a second embodiment of the invention. In the second embodiment, the host computer 10 and the license server 20 are constituted by different devices in the equipment management system 1 to perform the processes concerning the license management.

Figure 14:
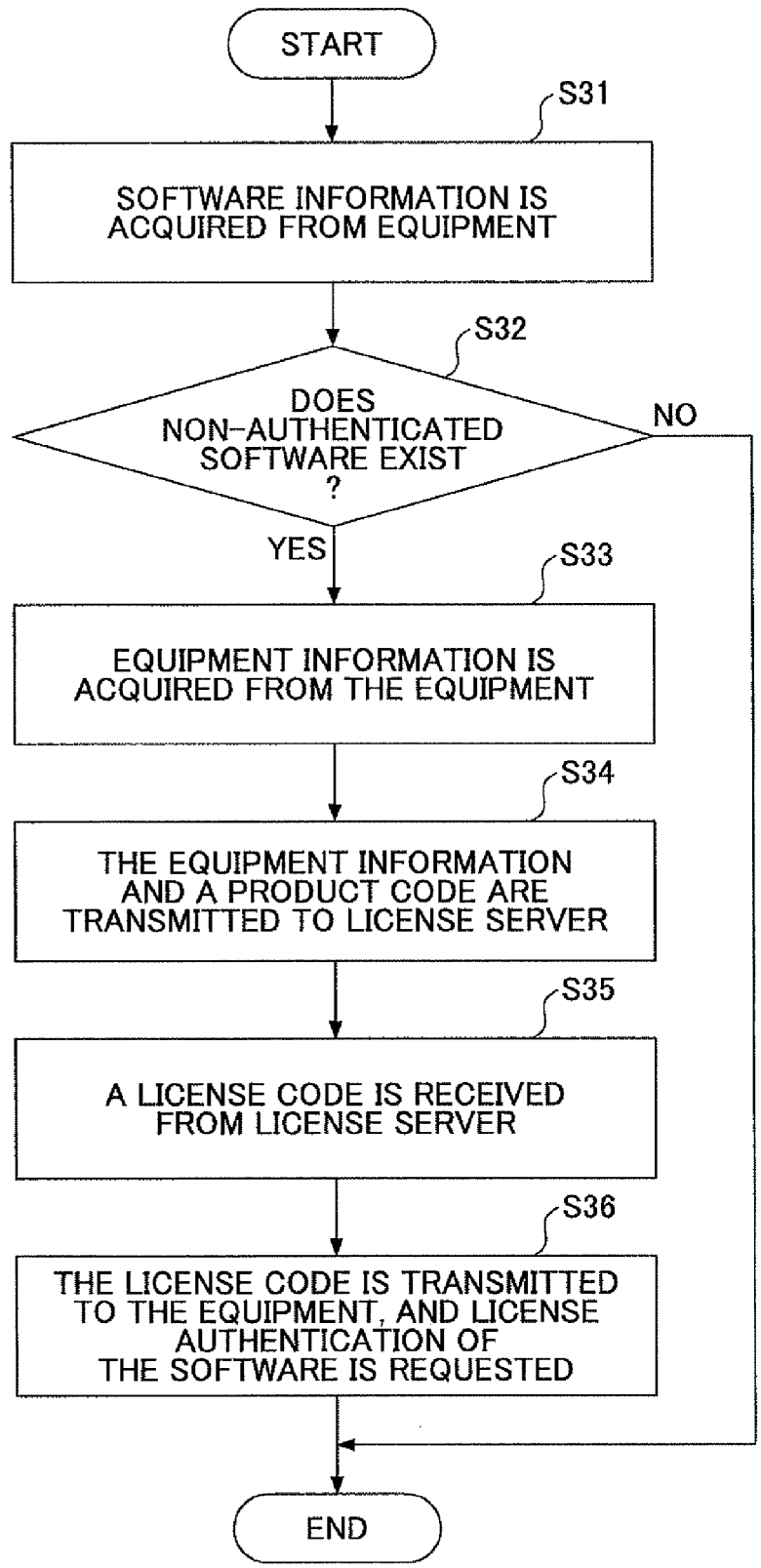
FIG. 14 is a flowchart for explaining a license authentication process of a second embodiment of the invention.

FIG. 14 is a flowchart for explaining a license authentication process of the second embodiment.

The steps S31-S33 shown in FIG. 14 are the same as the steps S11-S13 shown in FIG. 12, and a description thereof will be omitted. A description will be given of step S34 and subsequent steps in the process shown in FIG. 14.

The license management tool 101 of the host computer 10 transmits the equipment information 103 acquired in step S33 and a predetermined product key 104 corresponding to the software 102, to the license server 20 (step S34).

As a result, the license server 20 generates a license code 105 based on the equipment information 103 and the product key 104 which are received, and transmits the license code 105 to the host computer 10. Data transmission and reception between the license server 20 and the host computer 10 is performed through the network 40.

Subsequently, the license management tool 101 receives the license code 105 from the license server 20 (step S35).

Then, the license management tool 101 transmits the received license code 105 to the corresponding piece of the equipment 30, and requests execution of license authentication (step S36).

As a result, the corresponding piece of the equipment 30 performs license authentication of the non-authenticated item of the software 102 based on the license code 105 received in response to the request, and execution of the software item in the equipment 30 is permitted.

Figure 15:
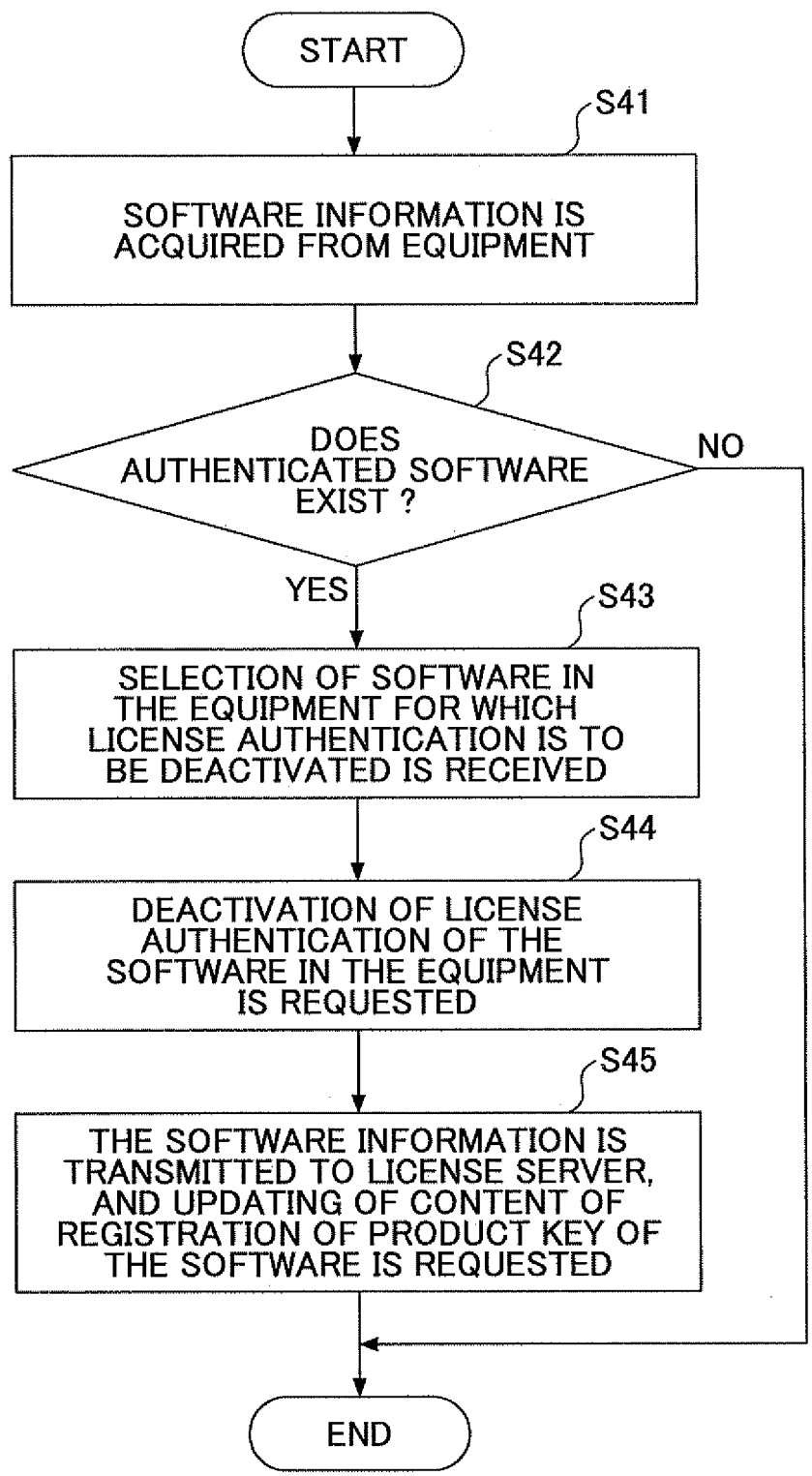
FIG. 15 is a flowchart for explaining a license authentication deactivation process of the second embodiment of the invention.

FIG. 15 is a flowchart for explaining a license authentication deactivation process of the second embodiment.

The steps S41-S44 shown in FIG. 15 are the same as the steps S21-S24 shown in FIG. 13, and a description thereof will be omitted. A description will be given of step S45 in the process shown in FIG. 15.

After a request of deactivation request of license authentication is transmitted in step S44, the license management tool 101 of the host computer 10 requests the license server 20 to perform the updating of the contents of registration of the product key 104 corresponding to the canceled software item (step S45). At this time, the license management tool 101 transmits to the license server 20 the software information of the software 102 (the canceled software item) which is selected in step S43 and a predetermined deactivation request command, to request the license server 20 to perform the updating of the contents of registration of the product key 104.

As a result, the license server 20 performs the updating of the contents of registration of the product key 104 corresponding to the canceled software item based on the software information received in response to the request. Namely, the license information managed by the license server 20 is updated to indicate that re-use of the product key 104 used at the time of license authentication is allowed.

As described above, according to the license management function of the second embodiment, the same effect as in the first embodiment can be obtained. It is not necessary for the host computer 10 to hold the information concerning the license authentication, and the processes concerning the license authentication can be carried out by the license server 20 collectively. Namely, instead of the host computer 10 which is used directly by the user, the license server 20 has a license management function, and the license information can be managed with good confidentiality. A general user who has no administrator authority can also carry out the processes concerning the license management of the software 102.

Figure 16:
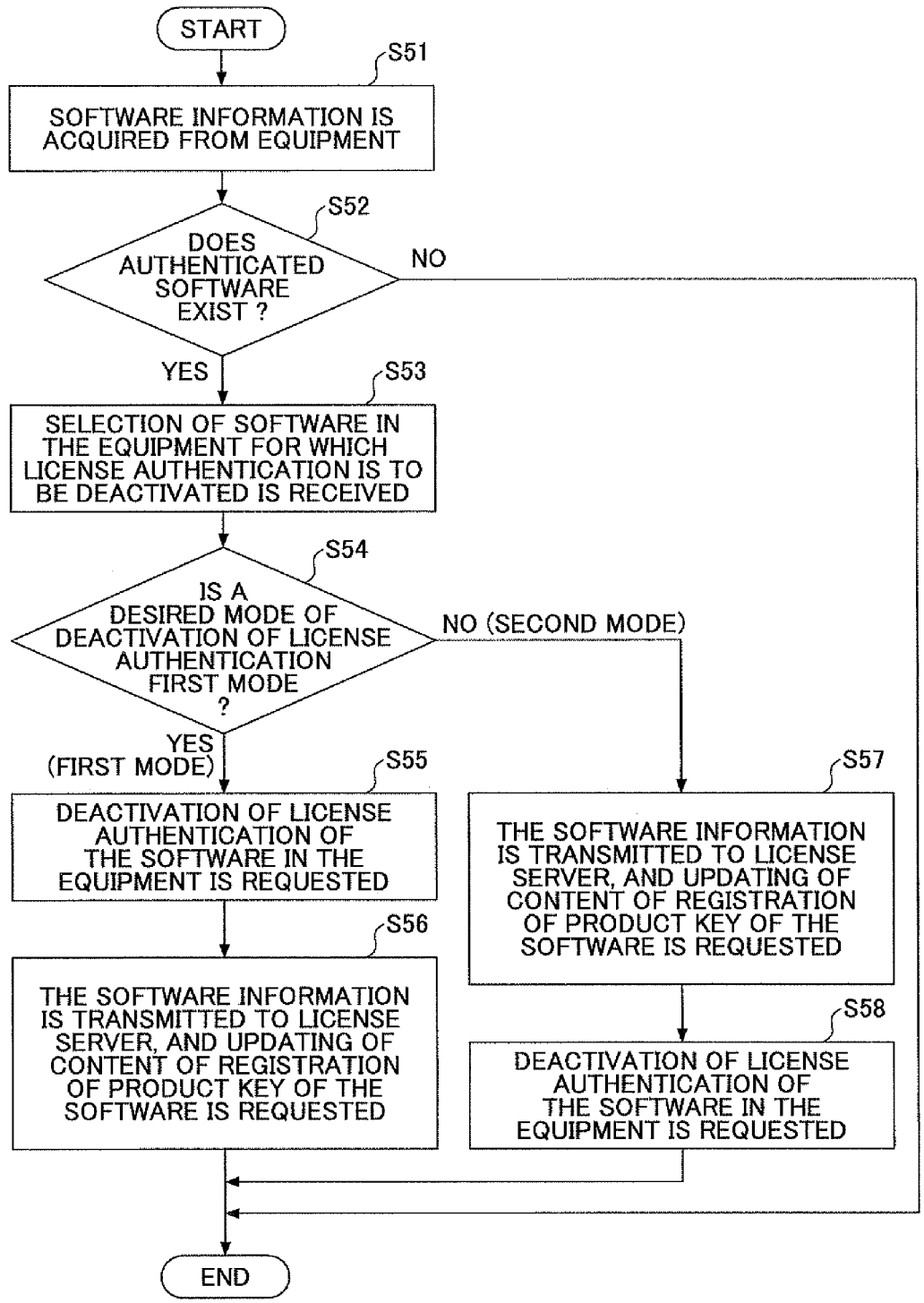
FIG. 16 is a flowchart for explaining a license authentication deactivation process of the second embodiment of the invention.

FIG. 16 is a flowchart for explaining a license authentication deactivation process of the second embodiment.

The steps S51 and S52 shown in FIG. 16 are the same as the steps S41 and S42 shown in FIG. 15, and a description thereof will be omitted. A description will be given of step S53 and subsequent steps in the process shown in FIG. 16.

The process shown in FIG. 16 differs from the process shown in FIG. 15 in that a switching control is performed to select one of a first operation mode in which the updating of the contents of registration of the product key 104 is performed after the equipment 30 is requested to perform deactivation of the license authentication, and a second operation mode in which the updating of the contents of registration of the product key 104 is performed before the equipment 30 is requested to perform deactivation of the license authentication.

When it is determined in step S52 that an authenticated software item exists, the license management tool 101 of the host computer 10 uses the above-described license authentication deactivation setting screen to receive selection of the item of the software 102 for which the license authentication is to be canceled (step S53).

Then, the license management tool 101 determines whether the desired mode of deactivation of the license authentication is the first operation mode or the second operation mode (step S54). The desired mode of deactivation of the license authentication can be set up by the user using the license authentication deactivation setting screen displayed on the display unit 17.

A desired one of the first operation mode and the second operation mode can be selected by the user using the license authentication deactivation setting screen. As described above, when the first operation mode is selected, the updating of the contents of registration of the product key 104 is performed after the equipment 30 is requested to perform deactivation of the license authentication. On the other hand, when the second operation mode is selected, the updating of the contents of registration of the product key 104 is performed before the equipment 30 is requested to perform deactivation of the license authentication.

When it is determined in step S54 that the desired mode of the deactivation is the first operation mode, the license management tool 101 transmits a request of deactivation of the license authentication of the selected software item to the equipment 30 (step S55).

Then, the license management tool 101 transmits the software information of the selected software item to the license server 20, and requests the license server 20 to perform the updating of the contents of registration of the product key 104 corresponding to the canceled software item (step S56).

On the other hand, when it is determined in step S54 that the desired mode of the deactivation is the second operation mode, the license management tool 101 transmits, to the license server 20, the software information of the selected software item, and requests the license server 20 to perform the updating of the contents of registration of the product key 104 corresponding to the canceled software item (step S57).

Then, the license management tool 101 requests the corresponding piece of the equipment 30 to perform deactivation of the license authentication of the selected software item (step S58).

Determination as to which one of the first operation mode or the second operation mode should be selected as the desired mode of deactivation of the license authentication described above will be made for the purpose of the actual license management to the software 102 installed in the equipment 30. For example, when the second operation mode is selected, reuse of the product key 104 will be allowed before the equipment 30 is requested to perform deactivation of the license authentication. This will promote prevention of an error of the updating of the license information including the contents of registration of the product key 104, and it is possible to improve convenience for the user.

However, in this case, there is a possibility that the license authentication of a certain item of the software 102 installed in another piece of the equipment 30 is performed by using the reusable product key 104. In such a case, execution of the item of the software 102 is permitted for two or more pieces of the equipment 30, which leads to unauthorized use of the software item.

When the first operation mode is selected, after the equipment 30 is requested to perform deactivation of the license authentication, re-use the product key 104 is allowed. It is possible to prevent the unauthorized use of the software item as described above.

As described above, according to the license management of the second embodiment, it is possible to control the license authentication deactivation process in accordance with the purpose of the actual license management to the software 102 installed in the equipment 30 (the prevention of unauthorized use of the software 102 or the improvement of convenience for the user).

A description will be given of the third embodiment of the invention. In the third embodiment, the processes concerning the license management are performed by the equipment management system 1 which is the same as in the second embodiment.

In the processes concerning the license management in the third embodiment, activation and/or deactivation of the license authentication is performed collectively for two or more selected pieces of the software 102.

Figure 17:
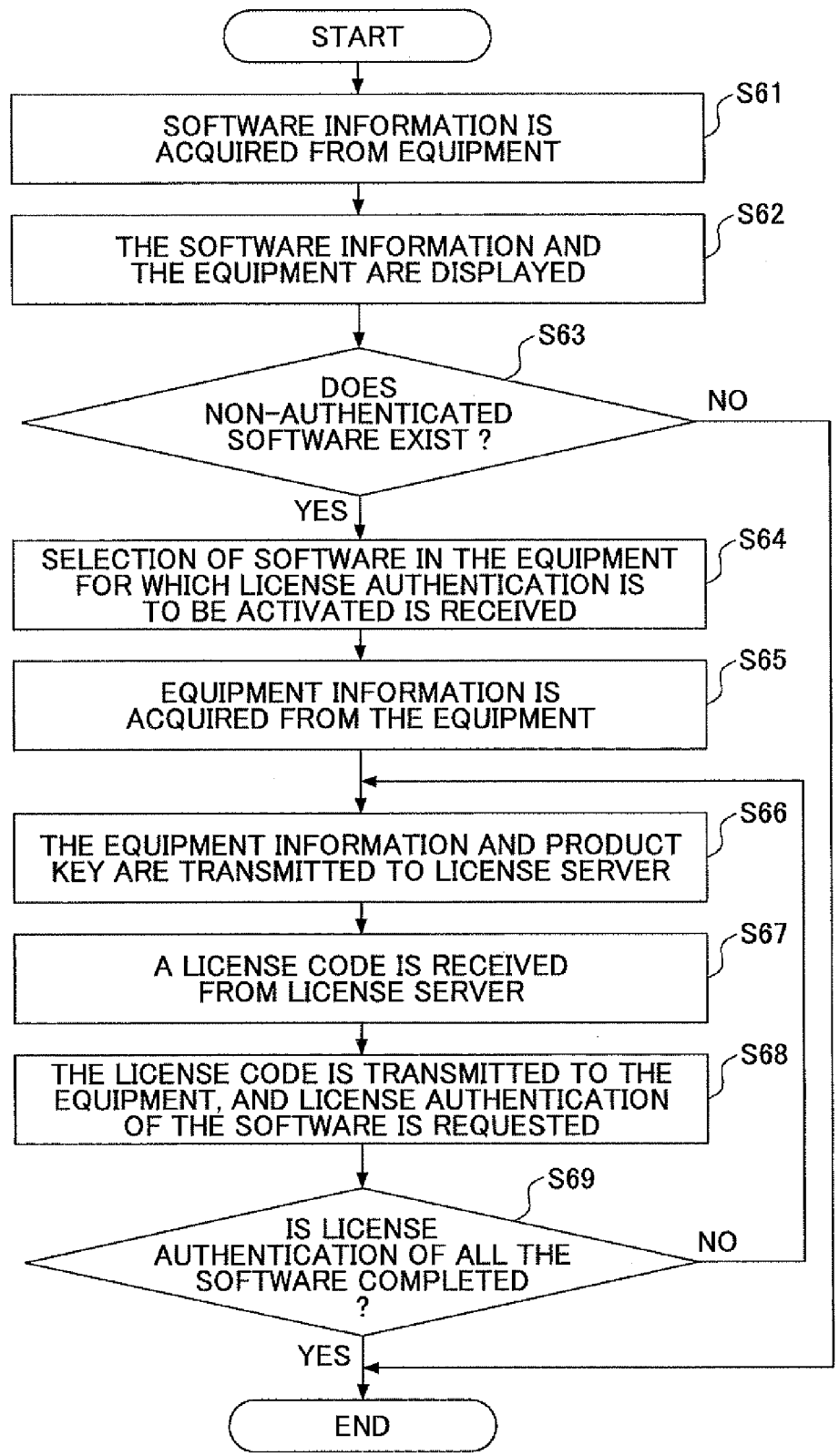
FIG. 17 is a flowchart for explaining a license authentication process of a third embodiment of the invention.

FIG. 17 is a flowchart for explaining a license authentication process of the third embodiment.

Upon start of the process of FIG. 17, the license management tool 101 of the host computer 10 acquires the software information from the equipment 30 (step S61).

Then, the license management tool 101 displays the acquired software information as a list with the information of the equipment 30 of the acquisition place (step S62). For example, the information of the equipment 30 displayed at this time may include the equipment information 103 acquired at the time of registration of the equipment 30.

Then, based on the acquired software information, the license management tool 101 determines whether a non-authenticated item of the software 102 exists among the items of the software 102 installed in the equipment 30 (step S63).

When it is determined in step S63 that a non-authenticated software item does not exist, the process is terminated. On the other hand, when it is determined in step S63 that a non-authenticated software item exists, the license management tool 101 displays the above-described license authentication setting screen, and receives selection of one or more items of the software 102 for which the license authentication is to be activated (step S64). Namely, the user selects one or more items of the software 102 for which the license authentication is to be activated from among the non-authenticated items of the software 102 which are displayed in the license authentication setting screen. Two or more non-authenticated items of the software 102 may be selected or all the non-authenticated items of the software 102 may be selected collectively.

Then, the license management tool 101 acquires the equipment information 103 from the equipment 30 (step S65). The license management tool 101 transmits the acquired equipment information 103 and one or more predetermined product keys 104 corresponding to the selected software items, to the license server 20 (step S66).

As a result, the license server 20 generates one or more license codes 105 based on the equipment information 103 and the product keys 104 which are received, and transmits the license codes 105 to the host computer 10.

Subsequently, the license management tool 101 receives the one or more license codes 105 from the license server 20 (step S67).

Then, the license management tool 101 transmits the received license codes 105 to the corresponding piece of the equipment 30, and requests the corresponding piece of the equipment 30 to perform the license authentication (step S68).

As a result, based on the license codes 105 received in response to the request, the corresponding piece of the equipment 30 performs the license authentication of the non-authenticated software item, and execution of the software item is permitted.

Finally, the license management tool 101 determines whether the license authentication of all the selected software items is completed (step S69).

When it is determined in step S69 that the license authentication of all the selected software items is not completed, the license management tool 101 repeats performing the above-mentioned steps S66-S68. On the other hand, when it is determined in step S69 that the license authentication of all the selected software items is completed, the license management tool 101 terminates the process of FIG. 17.

Thus, the license management tool 101 repeatedly performs the license authentication process until the license authentication of all the selected software items is completed (the number of repetitions corresponding to the number of license codes 105 generated by the license server 20).

Figure 18:
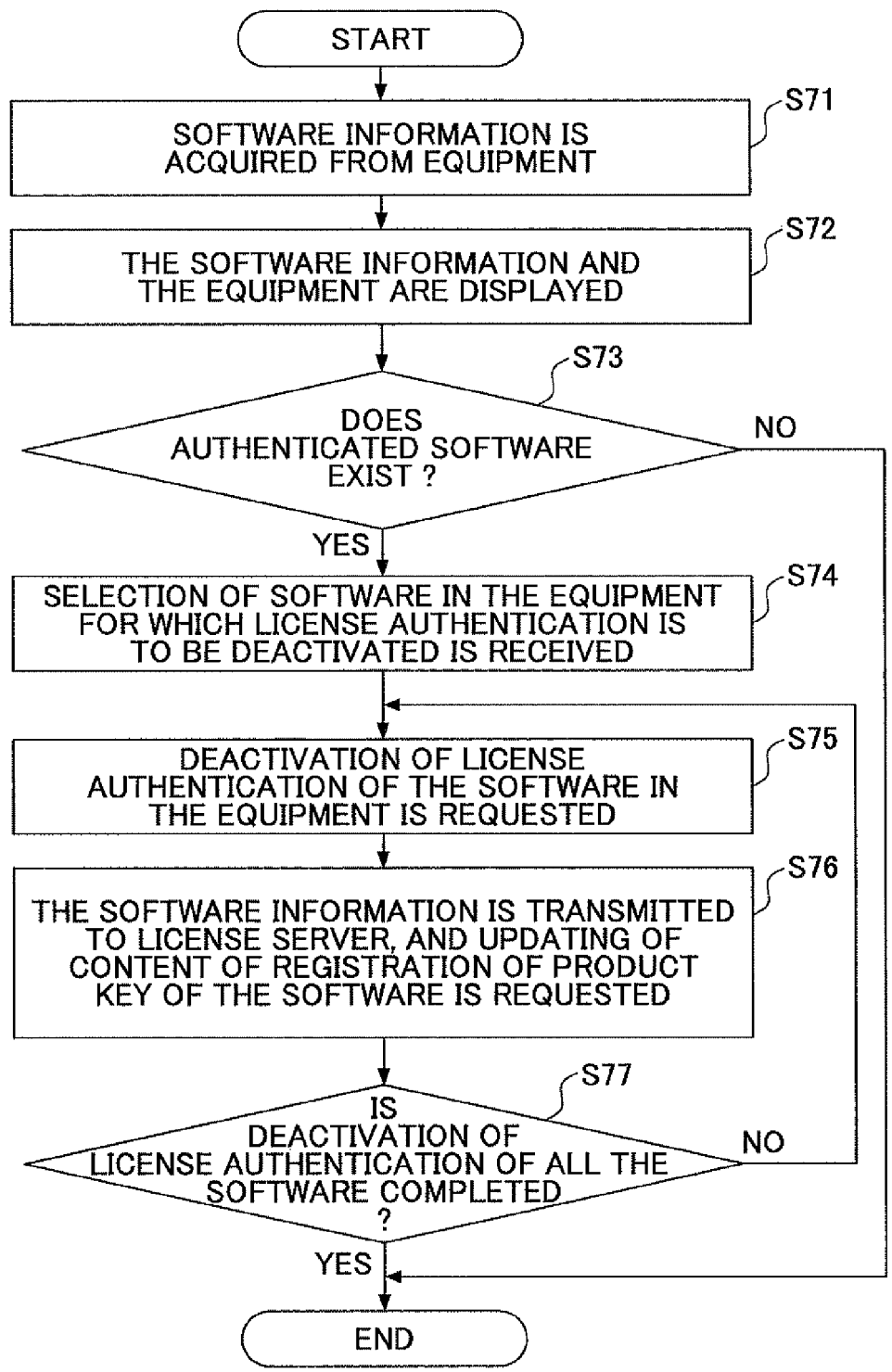
FIG. 18 is a flowchart for explaining a license authentication deactivation process of the third embodiment of the invention.

FIG. 18 is a flowchart for explaining a license authentication deactivation process of the third embodiment.

Upon start of the process of FIG. 18, the license management tool 101 of the host computer 10 acquires the software information from the equipment 30 (step S71).

Then, the license management tool 101 displays the acquired software information as a list with the information of the equipment 30 of the acquisition place (step S72).

Then, based on the acquired software information, the license management tool 101 determines whether an authenticated item of the software 102 exists among the items of the software 102 installed in the equipment 30 (step S73).

When it is determined in step S73 that an authenticated software item does not exist, the process is terminated. On the other hand, when it is determined in step S73 that an authenticated software item exists, the license management tool 101 displays the above-described license authentication deactivation setting screen, and receives selection of one or more items of the software 102 for which the license authentication is to be deactivated (step S74). Namely, the user selects one or more items of the software 102 for which the license authentication is to be deactivated from among the authenticated items of the software 102 which are displayed in the license authentication deactivation setting screen. Two or more authenticated items of the software 102 may be selected or all the authenticated items of the software 102 may be selected collectively.

Then, the license management tool 101 requests the corresponding piece of the equipment 30 to perform deactivation of the license authentication of the selected software items (step S75).

As a result, the corresponding piece of the equipment 30 performs deactivation of the license authentication of the selected software item in response to the request, and execution of the software item is inhibited.

Then, the license management tool 101 requests the license server 20 to perform the updating of the contents of registration of the product key 104 corresponding to the canceled software item (step S76).

As a result, the license server 20 performs the updating of the contents of registration of the product key 104 corresponding to the canceled software item based on the software information received in response to the request. Namely, the license information managed by the license server 20 is updated to indicate that re-use of the product key 104 used at the time of license authentication is allowed.

Finally, the license management tool 101 determines whether deactivation of the license authentication of all the selected software items is completed (step S77).

When it is determined in step S77 that the deactivation of the license authentication of all the selected software items is not completed, the license management tool 101 repeats performing the above-mentioned steps S75 and S76. On the other hand, when it is determined in step S77 that the deactivation of the license authentication of all the selected software items is completed, the license management tool 101 terminates the process of FIG. 18.

Thus, the license management tool 101 repeatedly performs the license authentication deactivation process until deactivation of the license authentication of all the selected software items is completed.

Alternatively, the above steps S74-S76 in the process of FIG. 18 may be the same as the steps S54-S58 in the process of FIG. 16.

As described above, according to the license management function of the third embodiment, the same effect as in the second embodiment can be obtained. When purchasing two or more licenses, such as a volume license, the processes concerning the license management (activation and/or deactivation of license authentication) of two or more items of the software 102 for the two or more pieces of the equipment 30 can be performed from the host computer 10 collectively. It is possible to improve convenience for the user.

Because the processes concerning the license management can be performed for two or more selected software items, the user is able to perform the license management for two or more items of the software 102 installed in the equipment 30 in accordance with the need for the license management.

A description will be given of the fourth embodiment of the invention. In the fourth embodiment, the processes concerning the license management are performed by the equipment management system 1 which is the same as in the second embodiment.

In the processing concerning the license management in the fourth embodiment, activation and/or deactivation of the license authentication is performed collectively for two or more pieces of equipment 30 in which the selected item of the software 102 operates.

Figure 19:
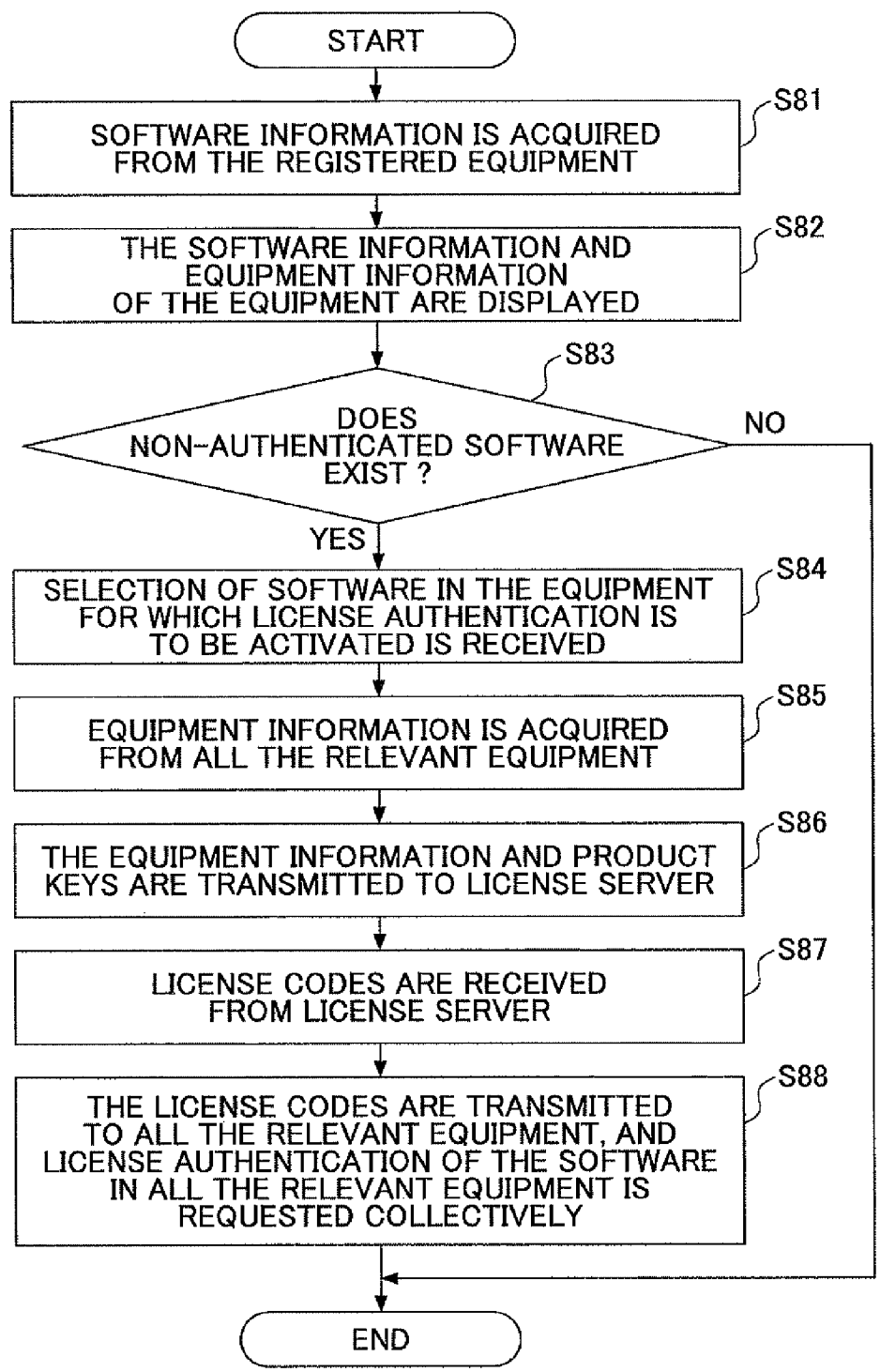
FIG. 19 is a flowchart for explaining a license authentication process of a fourth embodiment of the invention.

FIG. 19 is a flowchart for explaining a license authentication process of the fourth embodiment.

Upon start of the process of FIG. 19, the license management tool 101 of the host computer 10 acquires the software information from the equipment 30 (step S81).

Then, the license management tool 101 displays the acquired software information as a list with the information of the equipment 30 of the acquisition place (step S82).

Then, based on the acquired software information, the license management tool 101 determines whether a non-authenticated item of the software 102 exists among the items of the software 102 installed in the equipment 30 (step S83).

When it is determined in step S83 that a non-authenticated software item does not exist, the process is terminated. On the other hand, when it is determined in step S83 that a non-authenticated software item exists, the license management tool 101 displays the above-described license authentication setting screen, and receives selection of one or more items of the software 102 for which the license authentication is to be activated (step S84). Namely, the user selects one or more items of the software 102 for which the license authentication is to be activated from among the non-authenticated items of the software 102 which are displayed in the license authentication setting screen. Two or more non-authenticated items of the software 102 may be selected or all the non-authenticated items of the software 102 may be selected collectively.

Then, the license management tool 101 acquires the equipment information 103 from all the pieces of the equipment 30 (two or more pieces of equipment) in which the selected software item operates (step S85).

The license management tool 101 transmits the acquired equipment information (two or more items of equipment information) 103 and the predetermined product key 104 corresponding to the selected software item, to the license server 20 (step S86).

As a result, the license server 20 generates one or more license codes 105 based on the equipment information 103 and the product key 104 which are received, and transmits the license codes 105 to the host computer 10.

Subsequently, the license management tool 101 receives the one or more license codes 105 from the license server 20 (step S87).

Then, the license management tool 101 transmits the received license codes 105 to the corresponding piece of the equipment 30 collectively, and requests all the corresponding pieces of the equipment 30 to perform license authentication of the selected software item (step S88).

As a result, each of the corresponding pieces of the equipment 30 performs license authentication of the selected software item based on each license code 105 received in response to the request, and execution of the software item is permitted.

As described above, according to the license authentication process of the fourth embodiment, the same effect as in the second embodiment can be acquired. When two or more non-authenticated items of the software 102 installed in the equipment 30 exist, activation of the license authentication of the software items can be performed collectively. It is possible to improve convenience for the user.

A combination of the third embodiment and the fourth embodiment described above enables the user to perform collectively license authentication of the two or more items of the software 102 to the two or more pieces of the equipment 30 from the remote host computer 10. Thus, it is possible to further improve convenience for the user.

FIG. 20 is a flowchart for explaining a license authentication deactivation process of the fourth embodiment.

Upon start of the process of FIG. 20, the license management tool 101 of the host computer 10 acquires the software information from the equipment 30 (step S91).

Then, the license management tool 101 displays the acquired software information as a list with the information of the equipment 30 of the acquisition place (step S92).

Then, the license management tool 101 determines whether an authenticated software item exists among the items of the software 102 installed in the equipment 30, based on the acquired software information (step S93).

When it is determined in step S93 that an authenticated software item does not exist, the process is terminated. On the other hand, when it is determined in step S93 that an authenticated software item exists, the license management tool 101 displays the above-described license authentication deactivation setting screen, and receives selection of one or more items of the software 102 for which the license authentication is to be deactivated (step S94). Namely, the user selects one or more items of the software 102 for which the license authentication is to be deactivated from among the authenticated items of the software 102 which are displayed in the license authentication deactivation setting screen. At this time, two or more authenticated items of the software 102 may be selected or all the authenticated items of the software 102 may be selected collectively.

Then, the license management tool 101 requests all the pieces of the equipment 30 that install the selected software item to perform deactivation of the license authentication of the selected software item collectively (step S95).

As a result, the corresponding piece of the equipment 30 performs deactivation of the license authentication of the selected software item in response to the request, and execution of the software item is inhibited.

Then, the license management tool 101 requests the license server 20 to perform the updating of the contents of registration of the product key 104 corresponding to the canceled software item collectively (step S96).

As a result, the license server 20 updates the contents of registration of the product key 104 corresponding to the deactivated software item, based on the software information received in response to the request. Namely, the license information (the contents of registration of the product key 104) managed by the license server 20 is updated to indicate that re-use of the product key 104 used at the time of license authentication is allowed.

Alternatively, the above steps S94-S96 shown in FIG. 20 may be the same as the steps S54-S58 shown in FIG. 16.

As described above, according to the license authentication deactivation process of the fourth embodiment, the same effect as in the second or third embodiment can be obtained. When two or more items of the software 102 installed in the equipment 30 exists, deactivation of the license authentication of the software items can be performed collectively. It is possible to improve convenience for the user.

A combination of the third embodiment and the fourth embodiment enables the user to perform collectively deactivation of the license authentication of the two or more pieces of the software 102 to the two or more pieces of the equipment 30 from the remote host computer 10. Thus, it is possible to further improve convenience for the user.

The processes concerning the license management of each of the above-described embodiments may be carried out by executing the program coded with the programming language appropriate for the operating environment (platform) by a computer. The above-described program may be stored in the computer-readable recording medium 12. Examples of the recording medium 12 may include a floppy disk, a CD (compact disk), a DVD (digital versatile disk), etc. Thus, the above program in the recording medium 12 may be installed into the host computer (equipment management device) 10 by using the drive unit 11 which can read the program from the recording medium 12.

Alternatively, the recording medium 12 may be replaced with an external storage, such as an SD (secure digital) memory card or a USB (universal serial bus) memory. In such a case, the above program in the external storage may be installed into the host computer 10 by using a predetermined I/F unit (not illustrated) which can read the program from the external storage.

Because the host computer 10 includes the interface unit 16 which is connectable with the data transmission line, such as the network 40, the above program may be downloaded from the network 50 and may be installed in the host computer 10.

According to the present invention, it is possible to improve convenience for the user in performing activation and/or deactivation of the license authentication for one or more pieces of equipment collectively.

The present invention is not limited to the specifically disclosed embodiments, and variations and modifications may be made without departing from the scope of the present invention.

The present application is based on Japanese patent application No. 2008-122427, filed on May 8, 2008, Japanese patent application No. 2008-125161, filed on May 12, 2008, and Japanese patent application No. 2009-038186, filed on Feb. 20, 2009, the contents of which are incorporated herein by reference in their entirety.

What is claimed is:

1. An equipment management device including a processing unit to manage a plurality of pieces of equipment which are connected to the equipment management device via a network, the processing unit configured to:
   determine whether a non-authenticated software item exists in one of the plurality of pieces of equipment;
   perform license management of a plurality of software items installed in the one of the plurality of pieces of equipment, based on a result of the determination;
   transmit a request of license authentication to the one of the plurality of pieces of equipment when it is determined that a non-authenticated software item exists in the one of the plurality of pieces of equipment;
   determine whether a selected mode of deactivation of the license authentication is a first mode or a second mode when a request of deactivation of the license authentication input by a user is received; and
   request, in a case where the selected mode of deactivation is determined to be the first mode, the one of the plurality of pieces of equipment to deactivate the license authentication and subsequently update contents of registration of a product key of a software item so as to allow re-use of the product key, or update, in a case where the selected mode of deactivation is determined to be the second mode, the contents of registration of the product key of the software item so as to allow re-use of the product key and subsequently request the one of the plurality of pieces of equipment to deactivate the license authentication.

2. The equipment management device according to claim 1,
   wherein, when two or more pieces of equipment exist which install a plurality of software items determined as being the non-authenticated software items, the processing unit transmits a request of license authentication to all the corresponding pieces of equipment which install the plurality of software items selected as a license authentication object from among the plurality of non-authenticated software items.

3. The equipment management device according to claim 1,
wherein the processing unit is further configured to acquire software information of each of a plurality of software items installed in a corresponding piece of equipment, from the corresponding piece of equipment,
wherein the processing unit determines whether a non-authenticated software item exists in the corresponding piece of equipment, based on the software information acquired from the corresponding piece of equipment.

4. The equipment management device according to claim 1,
wherein the processing unit is further configured to:
acquire equipment information from a corresponding piece of equipment which installs a non-authenticated software item; and
generate a license code based on both a predetermined product key and the equipment information acquired from the corresponding piece of equipment,
wherein the processing unit transmits a request of license authentication with the license code generated, to the corresponding piece of equipment.

5. The equipment management device according to claim 1,
wherein the processing unit is further configured to:
acquire equipment information from a corresponding piece of equipment which installs a non-authenticated software item; and
acquire a license code from an authentication management device, based on both a predetermined product key and the equipment information acquired from the corresponding piece of equipment,
wherein the processing unit transmits a request of license authentication with the license code acquired from the authentication management device, to the corresponding piece of equipment.

6. The equipment management device according to claim 5,
wherein the processing unit acquires the license code from the authentication management device after the predetermined product key and the equipment information acquired from the corresponding piece of equipment are transmitted to the authentication management device.

7. The equipment management device according to claim 1,
wherein the processing unit is further configured to:
determine whether an authenticated software item exists in the one of the plurality of pieces of equipment;
transmit a request of deactivation of the license authentication to the one of the plurality of pieces of equipment when it is determined that an authenticated software item exists in the one of the plurality of pieces of equipment; and
update contents of registration of a product key corresponding to the authenticated software item installed in the one of the plurality of pieces of equipment, the contents of registration of the product key being managed by the equipment management device.

8. The equipment management device according to claim 1,
wherein the processing unit is further configured to:
determine whether an authenticated software item exists in the one of the plurality of pieces of equipment;
transmit a request of deactivation of the license authentication to the one of the plurality of pieces of equipment when it is determined that an authenticated software item exists in the one of the plurality of pieces of equipment; and
transmit to an authentication management device a request for updating contents of registration of a product key corresponding to the authenticated software item installed in the one of the plurality of pieces of equipment.

9. The equipment management device according to claim 7,
wherein, when it is determined that two or more authenticated software items exist, the processing unit transmits to the one of the plurality of pieces of equipment a request of deactivation of license authentication of respective software items selected as a license authentication deactivation object from among the two or more authenticated software items.

10. The equipment management device according to claim 7,
wherein, when two or more pieces of equipment exist which install a plurality of software items determined as being the authenticated software item, the processing unit transmits a request of deactivation of license authentication to all corresponding pieces of equipment which install a plurality of software items selected as a license authentication deactivation object from among the plurality of authenticated software items.

11. The equipment management device according to claim 8,
wherein the processing unit is further configured to acquire from the one of the plurality of pieces of equipment software information of each of a plurality of software items installed in the one of the plurality of pieces of equipment,
wherein the processing unit requests the authentication management device to update the contents of registration of the product key by transmitting the software information acquired from the one of the plurality of pieces of equipment to the authentication management device.

12. An equipment management method for use in an equipment management system in which a plurality of pieces of equipment and an equipment management device including a processing unit to manage the plurality of pieces of equipment are connected via a network, the equipment management method comprising:
causing the equipment management device to determine whether a non-authenticated software item exists in one of the plurality of pieces of equipment;
causing the equipment management device to acquire equipment information from the one of the plurality of pieces of equipment which installs a non-authenticated software item;
causing the equipment management device to generate a license code based on both a predetermined product key and the acquired equipment information;
causing the equipment management device to transmit a request of license authentication with the generated license code to the one of the plurality of pieces of equipment when it is determined that a non-authenticated software item exists in the one of the plurality of pieces of equipment;
causing the one of the plurality of pieces of equipment to perform license authentication based on the license code received from the equipment management device;
causing the equipment management device to determine whether a selected mode of deactivation of the license authentication is a first mode or a second mode when a request of deactivation of the license authentication input by a user is received; and causing, in a case where the selected mode of deactivation is determined to be the first mode, the equipment management device to request the one of the plurality of pieces of equipment to deactivate the license authentication and subsequently causing the equipment management device to update contents of registration of a product key of a software item so as to allow re-use of the product key, or causing, in a case where the selected mode of deactivation is determined to be the second mode, the equipment management device to update the contents of registration of the product key so as to allow re-use of the product key and subsequently causing the equipment management device to request the one of the plurality of pieces of equipment to deactivate the license authentication.

13. The equipment management method according to claim 12,
wherein an authentication management device to manage license authentication of software is connected to the equipment management device via the network in the equipment management system, the equipment management method further comprising:
causing the equipment management device to acquire a license code from the authentication management device based on both the acquired equipment information and a predetermined product key;
causing the equipment management device to transmit a request of license authentication with the acquired license code to the one of the plurality of pieces of equipment when it is determined that a non-authenticated software item exists in the one of the plurality of pieces of equipment;
causing the authentication management device to generate a license code based on the equipment information and the product key received from the equipment management device; and
causing the authentication management device to transmit the generated license code to the equipment management device.

14. The equipment management method according to claim 12, further comprising:
causing the equipment management device to determine whether an authenticated software item exists in the one of the plurality of pieces of equipment;
causing the equipment management device to transmit a request of deactivation of the license authentication to the one of the plurality of pieces of equipment when it is determined that an authenticated software item exists in the one of the plurality of pieces of equipment;
causing the equipment management device to update contents of registration of a product key corresponding to the authenticated software item installed in the one of the plurality of pieces of equipment, the contents of registration of the product key being managed by the equipment management device; and
causing the one of the plurality of pieces of equipment to deactivate the license authentication of the software item in response to the request received from the equipment management device.

15. The equipment management method according to claim 13, further comprising:

causing the equipment management device to determine whether an authenticated software item exists in the one of the plurality of pieces of equipment;
causing the equipment management device to acquire from the one of the plurality of pieces of equipment software information of each of a plurality of software items installed in the one of the plurality of pieces of equipment;
causing the equipment management device to transmit a request of deactivation of the license authentication to the one of the plurality of pieces of equipment when it is determined that an authenticated software item exists in the one of the plurality of pieces of equipment;
causing the equipment management device to transmit to the authentication management device a request for updating contents of registration of a product key corresponding to the authenticated software item installed in the one of the plurality of pieces of equipment, based on the acquired software information;
causing the authentication management device to update, in response to the request from the equipment management device, the contents of registration of the product key, the updated contents of registration of the product key being managed by the authentication management device; and
causing the one of the plurality of pieces of equipment to deactivate the license authentication of the software item in response to the request received from the equipment management device.

16. A non-transitory computer-readable recording medium storing a program which, when executed by a computer of an equipment management device including a processing unit to manage a plurality of pieces of equipment which are connected to the equipment management device via a network, causes the computer to perform an equipment management method, the equipment management method comprising:
determining whether a non-authenticated software item exists in one of the plurality of pieces of equipment;
performing license management of a plurality of software items installed in the one of the plurality of pieces of equipment, based on a result of the determination;
transmitting a request of license authentication to the one of the plurality of pieces of equipment when it is determined that a non-authenticated software item exists in the one of the plurality of pieces of equipment;
determining whether a selected mode of deactivation of the license authentication is a first mode or a second mode when a request of deactivation of the license authentication input by a user is received; and
requesting, in a case where the selected mode of deactivation is determined to be the first mode, the one of the plurality of pieces of equipment to deactivate the license authentication and subsequently updating contents of registration of a product key of a software item so as to allow re-use of the product key, or updating, in a case where the selected mode of deactivation is determined to be the second mode, the contents of registration of the product key so as to allow re-use of the product key and subsequently requesting the one of the plurality of pieces of equipment to deactivate the license authentication.

* * * * *